United States Patent [19]

Ukawa et al.

[11] Patent Number: 5,192,518

[45] Date of Patent: Mar. 9, 1993

[54] METHOD FOR DESULFURIZING EXHAUST SMOKE

[75] Inventors: Naohiko Ukawa, Hiroshima; Susumu Okino, Kanonshin; Toru Takashina, Kanonshin; Masakazu Onizuka, Kanonshin; Kenji Inoue, Kanonshin, all of Japan

[73] Assignee: Mitsubishi Jukogyo Kabushiki Kaisha, Tokyo, Japan

[21] Appl. No.: 701,652

[22] Filed: May 16, 1991

[30] Foreign Application Priority Data

Jun. 20, 1990 [JP] Japan .................. 2-159869

[51] Int. Cl.⁵ .............. B01D 53/34; B01D 47/06; C01F 11/46
[52] U.S. Cl. .............. 423/244.08; 423/113; 423/240 R; 423/555
[58] Field of Search .............. 423/244 A, 244 R, 555, 423/113, 512 A, 156, , 242, 170; 210/222, 223, 695; 209/39, 40, 214, 478

[56] References Cited

U.S. PATENT DOCUMENTS

| | | | |
|---|---|---|---|
| 3,327,455 | 6/1967 | Werheimer | 209/478 |
| 4,386,057 | 5/1983 | Dobbins et al. | 423/113 |
| 4,632,810 | 12/1986 | Shinoda et al. | 423/166 |
| 4,687,649 | 8/1987 | Kuroda et al. | 423/555 |
| 4,696,804 | 9/1987 | Shinoda et al. | 423/555 |
| 5,019,360 | 5/1991 | Lehto | 423/132 |

FOREIGN PATENT DOCUMENTS 0263057 4/1988 European Pat. Off. .
91-02583 3/1991 PCT Int'l Appl. .

Primary Examiner—Michael Lewis
Assistant Examiner—Peter DiMauro
Attorney, Agent, or Firm—McAulay, Fisher, Nissen, Goldberg & Kiel

[57] ABSTRACT

For the purposes of solving a problem due to a fly ash and HF in an exhaust gas, maintaining the activity of calcium carbonate as an absorbent, and recovering a high-purity gypsum, there is here provided a method for desulfurizing an exhaust smoke which comprises the steps of leading the exhaust gas containing the fly ash to a gas absorbing step, removing $SO_2$ and the fly ash from the exhaust gas by the use of an absorbing solution slurry containing calcium carbonate as an absorbent in the gas absorbing step, and blowing air into the absorbing solution slurry circulating through the gas absorbing step to oxidize it and to thereby produce the gypsum, the aforesaid method being characterized by drawing a portion of the absorbing solution slurry therefrom, leading it to a magnetic field to separate and recover the fly ash from the absorbing solution slurry, and then returning, to the gas absorbing step, a portion or all of the absorbing solution slurry from which the fly ash has been separated.

2 Claims, 1 Drawing Sheet

METHOD FOR DESULFURIZING EXHAUST SMOKE

FIELD OF THE INVENTION AND RELATED ART STATEMENT

The present invention relates to a method for desulfurizing an exhaust smoke, and particularly, it relates to a method for desulfurizing an exhaust smoke containing a fly ash such as a coal combustion exhaust gas.

In the practice of a method for desulfurizing an exhaust smoke on the basis of a well-known wet lime process, the exhaust gas contains HF as a harmful component in addition to $SO_x$ sometimes.

One example of the coal combustion exhaust gas contains about 1000 ppm of $SO_x$ (SO, $SO_2$ etc.) and about 40 ppm of HF.

In case that such an exhaust gas is treated by the use of $CaCO_3$ as an absorbent in a wet exhaust gas treating tower, for example, in case that $SO_2$ of $SO_x$ is treated, the following reactions take place.

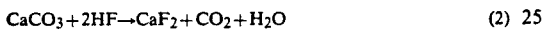

Here, in case that a large amount of a fly ash is contained in the exhaust gas, an Al component present in the fly ash is dissolved and then reacted with HF in the gas to produce fluorides (hereinafter referred to as "$AlF_x$").

It is known that the $AlF_x$ hinders the dissolving function of limestone ($CaCO_3$).

In Japanese Patent Laid-open No. 55-167023, it has been suggested that the above-mentioned problem can be solved by adding a basic sodium salt.

That is, in the treatment of the exhaust gas containing $SO_2$ and HF, if the basic sodium salt is added in an amount corresponding to that of HF, it can be presumed that the exhaust gas is effectively treated without any trouble due to $AlF_x$.

In this case, however, the fed sodium is dissolved and remains in an absorbing solution, and therefore, when the amount of a waste solution is decreased, the concentration of sodium is increased in the absorbing solution. For this reason, when a gypsum is recovered from the absorbing solution, the purity of the recovered gypsum tends to lower inconveniently.

Furthermore, as another means for solving the problem, Japanese Patent Laid-open No. 60-122029 discloses that an alkaline compound is added intermittently so as to increase the pH of an absorbing solution temporarily, with the result that the problem due to $AlF_x$ can be prevented.

In the case of this process, however, the efficiency of the desulfurization is low till the recovery of desulfurization performance, though the time of its low efficiency is short. In addition, from the viewpoint of the purity of a gypsum which is the by-product of the wet lime process, the contamination of the gypsum with a fly ash inconveniently leads to the decrease of the purity of the gypsum.

OBJECT AND SUMMARY OF THE INVENTION

In view of the above-mentioned technical level, the present invention intends to provide a method for treating an exhaust gas without any problems of the conventional techniques.

The present invention is directed to a method for desulfurizing an exhaust smoke which comprises the steps of leading the exhaust gas containing a fly ash to a gas absorbing step, removing $SO_2$ and the fly ash from the exhaust gas by the use of an absorbing solution slurry containing calcium carbonate as an absorbent in the gas absorbing step, and blowing air into the absorbing solution slurry circulating through the gas absorbing step to oxidize it and to thereby produce a gypsum, the aforesaid method being characterized by drawing a portion of the absorbing solution slurry therefrom, leading it to a magnetic field to separate and recover the fly ash from the absorbing solution slurry, and then returning, to the gas absorbing step, a portion or all of the absorbing solution slurry from which the fly ash has been separated.

Usually, the composition of the fly ash mainly comprises oxides of silicon, aluminum and iron, depending upon the composition of coal which is a fuel.

Of these components, the oxide of iron has strong magnetic properties. Therefore, when a magnetic field where magnetic lines of force are concentrated is made by the use of an electromagnet or a permanent magnet and the absorbing solution slurry containing the fly ash is then led to the magnetic field, the fly ash is only moved toward the magnet by magnetic force and finally separated and recovered form the slurry.

In the present invention, this principle is applied.

Usually, the absorbing solution slurry contains a mixture of unreacted calcium carbonate and a gypsum in the form of suspending particles in addition to the above-mentioned fly ash. However, the magnetic properties of calcium carbonate and the gypsum are low, and thus the fly ash can be only separated and recovered from the slurry in the magnetic field. After the separation, a portion or all of the slurry is returned to the absorbing step, whereby the fly ash which is an Al source can be removed from the absorbing solution slurry. Consequently, the problem due to the $AlF_x$ can be solved, and the amount of the fly ash, which contaminates the by-product gypsum obtained by filtering the absorbing slurry, can be decreased.

For example, the absorbing solution slurry contains 20% by weight of the slurry sometimes, and this slurry comprises 18.0% by weight of the gypsum, 0.5% by weight of limestone and 1.5% by weight of the associated fly ash. In this case, if the by-product gypsum collected by the filtration has the same composition as in the slurry, the purity of the by-product gypsum is presumed to be 90% by weight on calculation.

Now, if the fly ash is removed from the slurry by applying the method of the present invention so that removal ratio of the fly ash may be 90%, the concentration of the fly ash in the absorbing solution slurry of the above-mentioned example is 0.15% by weight, and therefore the purity of the by-product gypsum can be improved up to 96.5% by weight.

As described above, according to the present invention, the problem due to the fly ash and HF present in the exhaust gas can be solved, and as a result, the activity of $CaCO_3$ can be maintained and the high-purity gypsum can be recovered.

DETAILED DESCRIPTION OF PREFERRED EMBODIMENTS

Figure 1:
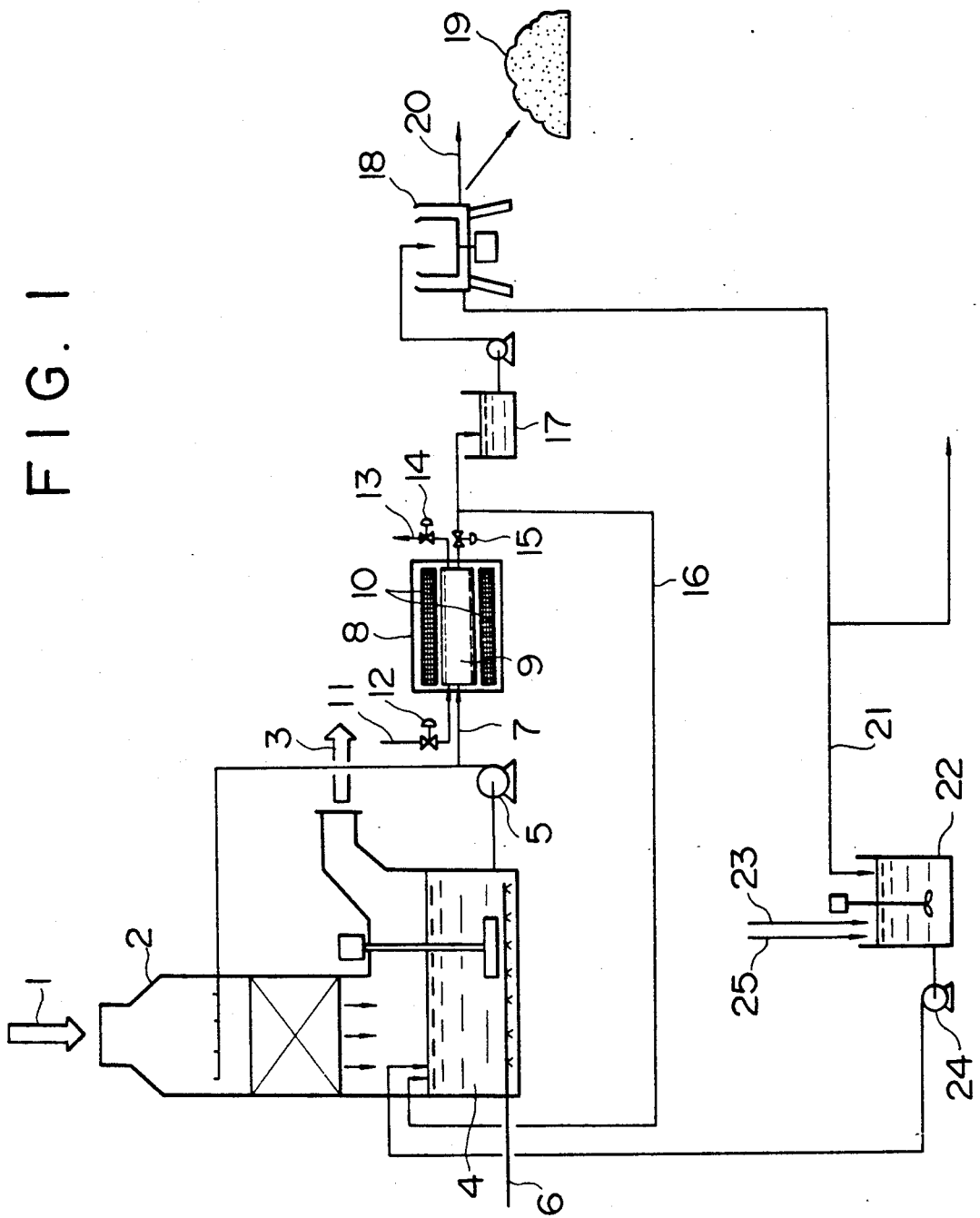
FIG. 1 is a schematic view illustrating one embodiment of the present invention.

One embodiment of the present invention will be described in detail in reference to FIG. 1.

200 $Nm^3$/hour of an exhaust gas from a small-sized fine coal-fired device (not shown) is treated in accordance with a method for treating an absorbing solution slurry of the present invention shown in FIG. 1.

A gas temperature at the inlet of the device is adjusted to 110° C. by the heat of the exhaust gas to be treated and a heat exchanger (not shown), and the concentration of a fly ash in the gas is adjusted to about 400 mg/$Nm^3$ by a cyclone and a bag filter (not shown). Concentrations of $SO_2$ and HF at the inlet of the device are 3000 ppm and 40 ppm, respectively.

The exhaust gas to be treated is introduced into an absorbing tower 2 through a line 1, and in the tower 2, $SO_2$, HF and the fly ash are removed from the gas and then discharged through a line 3.

Under the above-mentioned absorbing tower 2, a slurry tank 4 is disposed in which the absorbing solution slurry is stored, and to the bottom portion of the tower 2, air for oxidization is fed.

The above-mentioned absorbing solution slurry is circulated from the slurry tank 4 to the upper portion of the absorbing tower 2 by means of an absorbing solution pump 5.

A portion of the absorbing solution slurry is drawn from the above-mentioned circulation line through a line 7 and then forwarded to a fly ash separator 8.

This fly ash separator 8 is composed of an inner cylinder 9 and an electromagnet 10 disposed on the outer periphery of the inner cylinder 9, and its constitution is made so that the absorbing solution slurry fed into the inner cylinder 9 is subjected to a magnetic field.

The fly ash in the running slurry is only collected on the surface of the inner cylinder 9 by magnetic force, and the thus collected fly ash is discharged from the system through a line 13 together with industrial water which is fed to the fly ash separator 8 by opening a valve 12 disposed on a line 11 at certain intervals. At this time, the feed of electric power to the electromagnet 10 is stopped, and the fly ash is separated from the surface of the inner cylinder 9. Moreover, a valve 14 is opened and a valve 15 is closed, so that the fly ash is discharged from the system.

A portion of the slurry from which the fly ash has been separated is circulated to the slurry tank 4 via a line 16. Furthermore, the remaining slurry is fed to a centrifugal separator 18 via a tank 17, and in this separator 18, a high-purity gypsum 19 is separated.

A portion of the filtrate from which the gypsum has been separated is discharged through a line 20, and the remaining filtrate is delivered to a limestone preparation tank 22 through a line 21.

A limestone powder is fed to the limestone preparation tank 22 through a line 23, and in this tank 22, a limestone slurry having a predetermined concentration is prepared. Afterward, the certain amount of the thus prepared slurry is fed to the slurry tank 4 by means of a limestone slurry feed pump 24.

In addition to the filtrate, make-up water is fed to the limestone slurry preparation tank 22 through a line 25.

Under the above-mentioned conditions, a magnetic field of 5000 gauss was applied to the fly ash separator 8, and a steady operation was carried out. As a result, when the concentration of $SO_2$ in an outlet gas was 115 ppm, the stable operation could be effected, and at this time, the pH of the absorbing slurry in the slurry tank 4 was 5.6. Furthermore, the concentration of $CaCO_3$ in the absorbing solution was 0.05 mol/liter, and the reactivity of $CaCO_3$ was high.

According to measurement, concentrations of Al and F in the filtrate of the absorbing solution were low, 1.0 mg/liter and 25 mg/liter, respectively. In addition, according to analysis, the purity of the resultant gypsum was 96% or more, and the appearance of the gypsum was white.

COMPARATIVE EXAMPLE

The same procedure as in the above-mentioned example was repeated by the use of the same device under the same gas conditions as in the above example except that the feed of electric power to the electromagnet 10 was stopped.

In this comparative example, the pH of the absorbing solution slurry in the slurry tank 4 gradually decreased after the start of the operation, and finally it became 4.4. The concentration of $CaCO_3$ in the absorbing solution was constant, 0.05 mol/liter, since it was controlled as in the above example. However, judging from the decrease of the pH, the reactivity of $CaCO_3$ noticeably declined, as compared with the above example. Furthermore, the concentration of $SO_2$ in the outlet gas was 280 ppm, which meant that a desulfurization ratio also lowered.

Concentrations of Al and F in this filtrate of the absorbing solution were 86 mg/liter and 140 mg/liter, respectively. According to analysis, the purity of the resultant gypsum was 92%, and the appearance of the gypsum was gray, which meant that the gypsum was contaminated with a fly ash.

We claim:

1. In a method for desulfurizing an exhaust gas containing aluminum and fluorine components which comprises the steps of leading said exhaust gas containing fly ash with aluminum components to a gas absorbing step, removing $SO_2$ and said fly ash from said exhaust gas by the use of an absorbing slurry solution to which calcium carbonate is fed as an absorbent in said gas absorbent step, and blowing air into said absorbing solution slurry circulating through said gas absorbing step to oxidize it and to thereby produce a gypsum, the improvement which comprises introducing a portion of said absorbing solution slurry containing said fly ash to a magnetic field to separate and recover said fly ash from said absorbing solution slurry, and then returning at least a portion of said absorbing solution slurry from which said fly ash has been separated to said gas absorbing step to promote dissolution of said calcium carbonate and wherein a portion of the absorbing solution slurry from which fly ash has been separated is treated to separate and recover gypsum of reduced fly ash content relative to that recovered without the magnetic field.

2. The method for desulfurizing an exhaust smoke according to claim 1 wherein a magnetic field of 5000 gauss is applied to said absorbing solution slurry to separate and recover said fly ash therefrom.

* * * * *